United States Patent
Ogihara (10) Patent No.: US 7,630,628 B2
(45) Date of Patent: Dec. 8, 2009

(54) MICROSCOPE SYSTEM AND MICROSCOPE OBSERVATION METHOD

(75) Inventor: Yasushi Ogihara, Yokohama (JP)

(73) Assignee: Nikon Corporation, Tokyo (JP)

(*) Notice: Subject to any disclaimer, the term of this patent is extended or adjusted under 35 U.S.C. 154(b) by 165 days.

(21) Appl. No.: 11/878,880

(22) Filed: Jul. 27, 2007

(65) Prior Publication Data

US 2009/0028544 A1 Jan. 29, 2009

(51) Int. Cl.
*G02B 21/26* (2006.01)
*G02B 21/36* (2006.01)
*H04N 9/47* (2006.01)

(52) U.S. Cl. .................. 396/432; 348/79; 359/363; 359/393

(58) Field of Classification Search .................. 396/432; 348/79, 80; 382/133, 255, 282; 359/363, 359/368, 382, 391, 393
See application file for complete search history.

(56) References Cited

U.S. PATENT DOCUMENTS

2002/0090127 A1* 7/2002 Wetzel et al. ............... 382/133

FOREIGN PATENT DOCUMENTS

| JP | A 2002-277754 | 9/2002 |
|---|---|---|
| JP | A 2006-023494 | 1/2006 |
| JP | A 2006-203448 | 8/2006 |

* cited by examiner

*Primary Examiner*—Rochelle-Ann J Blackman
(74) *Attorney, Agent, or Firm*—Oliff & Berridge, PLC (57) ABSTRACT

A microscope system that shifts a plurality of observation locations that are set upon an observation subject in order onto an optical axis of an objective optical system, and for each of the observation locations, performs photography with an image-capturing device of an observation image of the observation subject a plurality of times as time elapses, includes: a drive unit that drives a stage upon which the observation subject is mounted, and the objective optical system, relative to one another two dimensionally in directions orthogonal to the optical axis; a position detection unit that detects at least one of positions of the stage and the objective optical system; and a correction unit that, based upon position information detected by the position detection unit, performs trimming correction upon a plurality of photographic images that have been photographed at each observation location as time elapses, so that the plurality of photographic images become images of a same observation region that includes the observation location.

7 Claims, 7 Drawing Sheets

FIG.1

FIG.2A  CONCEPTUAL FIGURE SHOWING RELATIONSHIP BETWEEN MACRO IMAGE AND MICRO IMAGE

FIG.2B  CONTENTS OF DISPLAY ON MONITOR 40

MICROSCOPE SYSTEM AND MICROSCOPE OBSERVATION METHOD

INCORPORATION BY REFERENCE

The disclosure of the following application is herein incorporated by reference:

Japanese Patent Application No. 2005-062173, filed Mar. 7, 2005.

BACKGROUND OF THE INVENTION

1. Field of the Invention

The present invention relates to a microscope system and to a microscope observation method.

2. Description of Related Art

In the prior art, there is a per se known method of so called time lapse photography for observing specimens such as biological cells and the like, in which microscopic images are repeatedly photographed at fixed time intervals (for example, refer to Japanese Laid-Open Patent Publication 2002-277754). When photography is performed at a plurality of photographic points, this is termed multi-point time lapse photography in this method, an electrically operated stage upon which the specimen is mounted is driven, and photography is performed in order at these photographic points. This type of cyclic photography is performed a plurality of times at fixed time intervals, and a plurality of photographic images are acquired at each of the photographic points. And, after photography has ended, it is possible to observe the state of change over time of the specimen at each specified photographic point by replaying in sequence the plurality of images that have been photographed.

SUMMARY OF THE INVENTION

Now, with multi-point time lapse photography, in order to perform photography cyclically at the plurality of photographic points, a high positional setting accuracy is demanded for the stage when shifting it back to the same photographic point. If an error is present in the positioning of the stage, the photographic region undesirably deviates each time photography is performed, and, when the images that have been photographed are replayed-successively, the problem occurs that the image may appear unnatural because it shakes.

Furthermore, when high accuracy positioning of the stage is performed, feedback control is employed in which a linear encoder is used to detect the position of the stage. However, when the magnification of the optical system becomes high, the position setting accuracy for the stage that is demanded also becomes high, and so called hunting can occur, in which, as the system attempts to provide this high position setting accuracy, the stage reciprocates around its target position. Due to this, there is a fear that a long time may be required for setting the position of the stage, and that, in the worst case, hunting will not be stopped.

According to the 1st aspect of the present invention, a microscope system that shifts a plurality of observation locations that are set upon an observation subject in order onto an optical axis of an objective optical system, and for each of the observation locations, performs photography with an image-capturing device of an observation image of the observation subject a plurality of times as time elapses, comprises: a drive unit that drives a stage upon which the observation subject is mounted, and the objective optical system, relative to one another two dimensionally in directions orthogonal to the optical axis; a position detection unit that detects at least one of positions of the stage and the objective optical system; and a correction unit that, based upon position information detected by the position detection unit performs trimming correction upon a plurality of photographic images that have been photographed at each observation location as time elapses, so that the plurality of photographic images become images of a same observation region that includes the observation location.

According to the 2nd aspect of the present invention, in the microscope system according to the 1st aspect, it is preferred that the correction unit sets a common photographic region that is included in all of the plurality of photographic images as the same observation region.

According to the 3rd aspect of the present invention, in the microscope system according to the 1st aspect, it is preferred that there is further provided a control unit that stops driving by the drive unit of the stage or of the objective optical system, when the position information detected by the position detection unit comes within a position setting range that is set in advance.

According to the 4th aspect of the present invention, in the microscope system according to the 3rd aspect, it is preferred that the correction unit sets a trimming amount for the trimming correction according to a magnitude of the position setting range.

According to the 5th aspect of the present invention, a microscope observation method comprises: driving an observation subject to be onto an optical axis of an objective optical system; acquiring an observation image by capturing an image of the observation subject, each time the observation subject is driven so as to arrive upon the optical axis of the objective optical system; obtaining an amount of deviation of the observation image that has been captured with respect to a reference position; trimming the observation image based upon the observation image that has been captured and upon the amount of deviation that has been obtained; and displaying the trimmed observation image upon a display device.

According to the 6th aspect of the present invention, in the microscope observation method according to the 5th aspect, it is preferred that: a plurality of the observation images are acquired; and a region that is included in all of the plurality of observation images becomes a region after trimming.

According to the 7th aspect of the present invention, a computer-readable computer program product comprises a program that causes a computer to execute the microscope observation method according to the 5th aspect.

BRIEF DESCRIPTION OF THE DRAWINGS

FIGS. 2A and 2B are figures for explanation of photographic points a, b, and c that are displayed upon a display monitor 40: FIG. 2A is a conceptual figure showing the relationship between a macro image and a micro image, while

DESCRIPTION OF THE PREFERRED EMBODIMENTS

Figure 1:
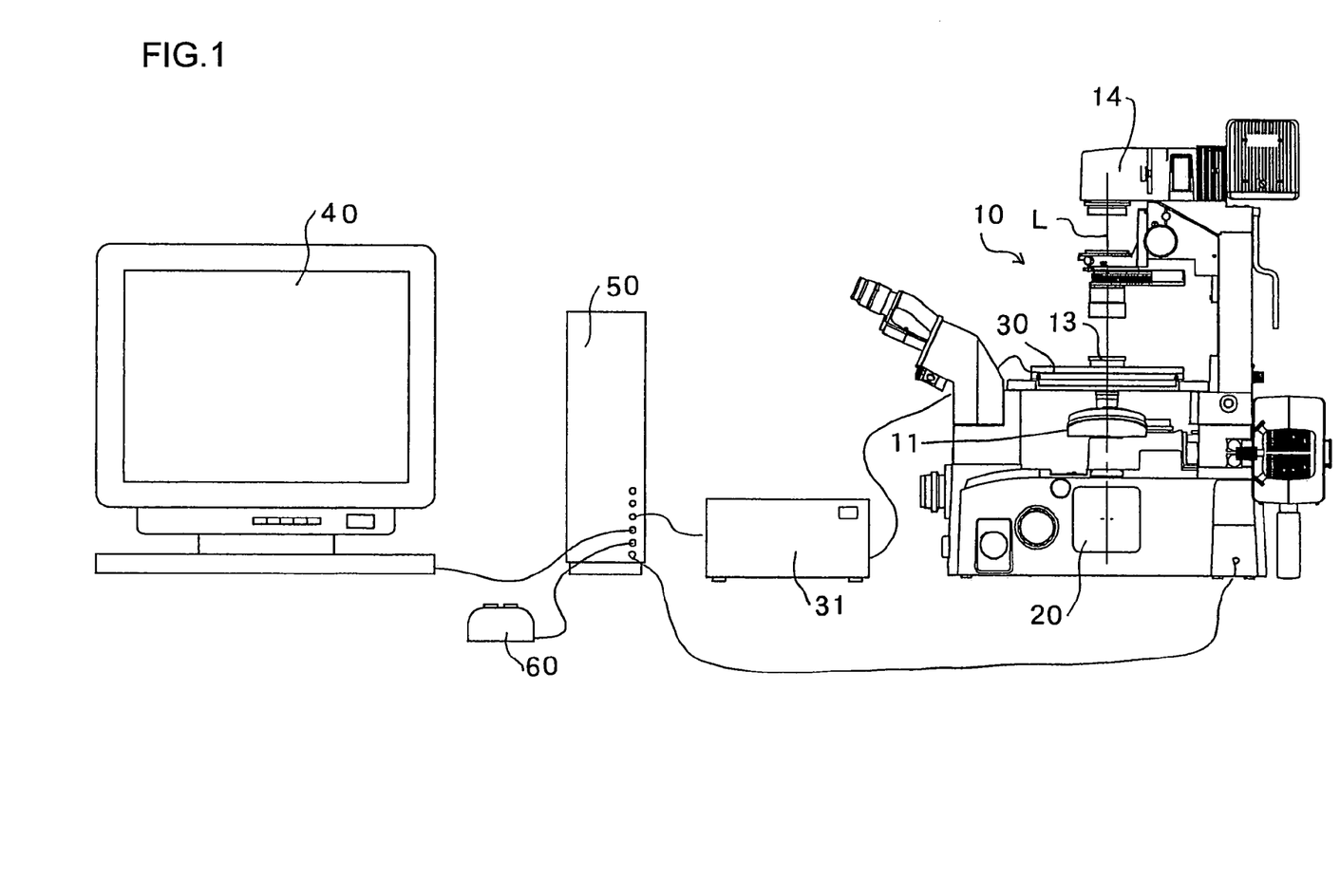
FIG. 1 is a figure showing an embodiment of a microscope system according to the present invention, and schematically shows the structure thereof.

In the following, preferred embodiments for implementation of the present invention will be explained with reference to the figures. FIG. 1 is a figure showing an embodiment of a microscope system according to the present invention, and schematically shows the structure thereof. The reference symbol 10 denotes an inverted type microscope, and an electrically operated stage is provided to this microscope 10. An electrically operated revolver 11 to which an objective lens 12 can be installed is provided below the electrically operated stage 30, and an illumination device 14 for illuminating a test specimen is provided over the electrically operated stage 30. A CCD image sensor, that serves as an image sensor, is provided internally to a camera 20 for photographing an observation image.

The electrically operated stage 30 includes an XY stage that is driven by a DC motor or the like, and, by driving this XY stage, a Petri dish (a Schale) containing a test specimen may be shifted along the X and Y directions. The x and y coordinates of this XY stage are detected by linear encoders (not shown in the figures) provided to the electrically operated stage 30. And a stage controller 31 is connected to the electrically operated stage 30, and controls the shifting operation of the electrically operated stage 30. Addresses are allocated to various objective fitting apertures in the electrically operated revolver 11, so that the magnification of the objective lens 12 that is located upon the optical axis L can be detected from a table that is inputted in advance. It should be understood that it would also be acceptable to arrange for the electrically operated revolver 11 as well to be driven in the X and Y directions by electrical operation, and for its XY coordinates to be acquired with linear encoders. That is to say, it would be acceptable for it to be possible to drive the electrically operated stage 30 and the electrically operated revolver 11 in the X and Y directions relative to one another, and for it to be arranged to detect positional information (X and Y coordinates) for both of them.

The reference symbol 50 denotes a PC (personal computer) that performs control of the overall microscope system and image processing and the like; the above described stage controller 31 and microscope 10 are connected to this PC 50, and the positional information from the encoders, magnification information for the objective lens 12, and photographic data and so on from the camera 20 are all inputted thereto. Furthermore, a monitor 40, a pointing device 60 such as a mouse or the like, and a keyboard (not shown in the figures) are connected to the PC 50, so that a microscope image that has been photographed by the camera 20 may be displayed upon the monitor 40. As shown in FIG. 2B, on the monitor 40, there are provided a display region 40Y in which an overall image of the Petri dish 13 (i.e. a macro image) is displayed, and a display region 40X in which an image of a photographic point a, b, or c within the Petri dish 13 (i.e. a micro image) is displayed.

Acquisition of Photographic Image Data

When observing living cells, the Petri dish 13 is filled with a culture medium, and image photography is performed at predetermined intervals while the cells grow in that medium.

Figure 2A:
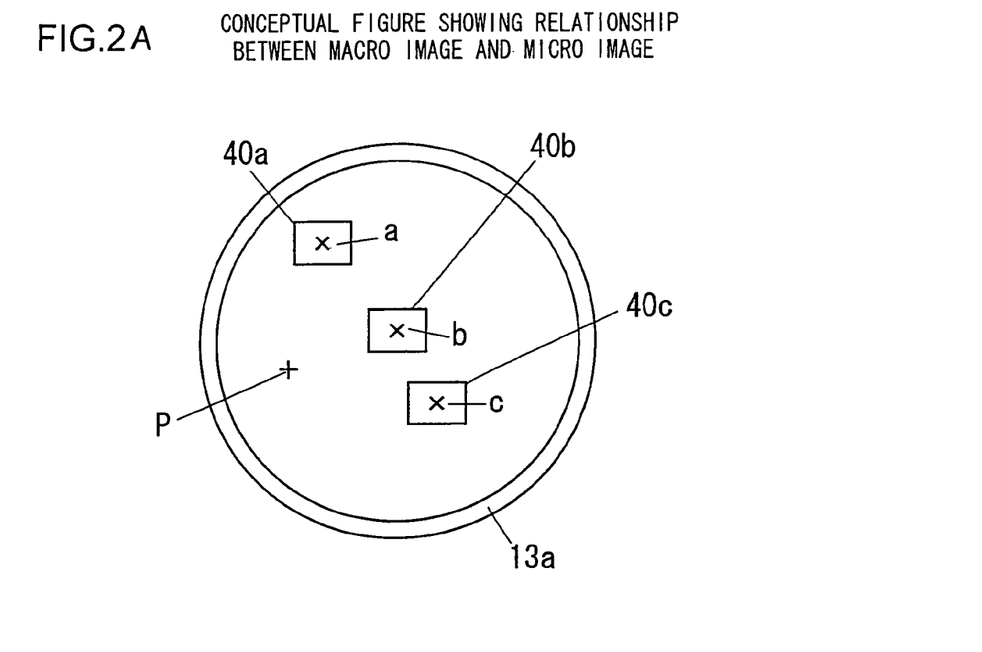
Figure 2B:
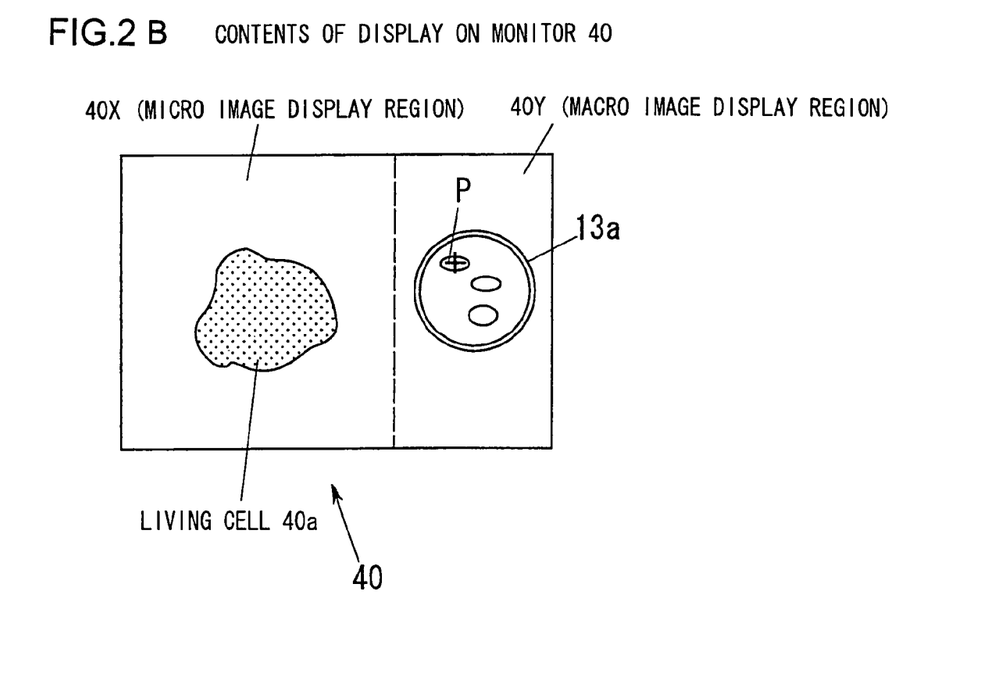
FIG. 2B shows the contents displayed upon the monitor 40.
Figure 3:
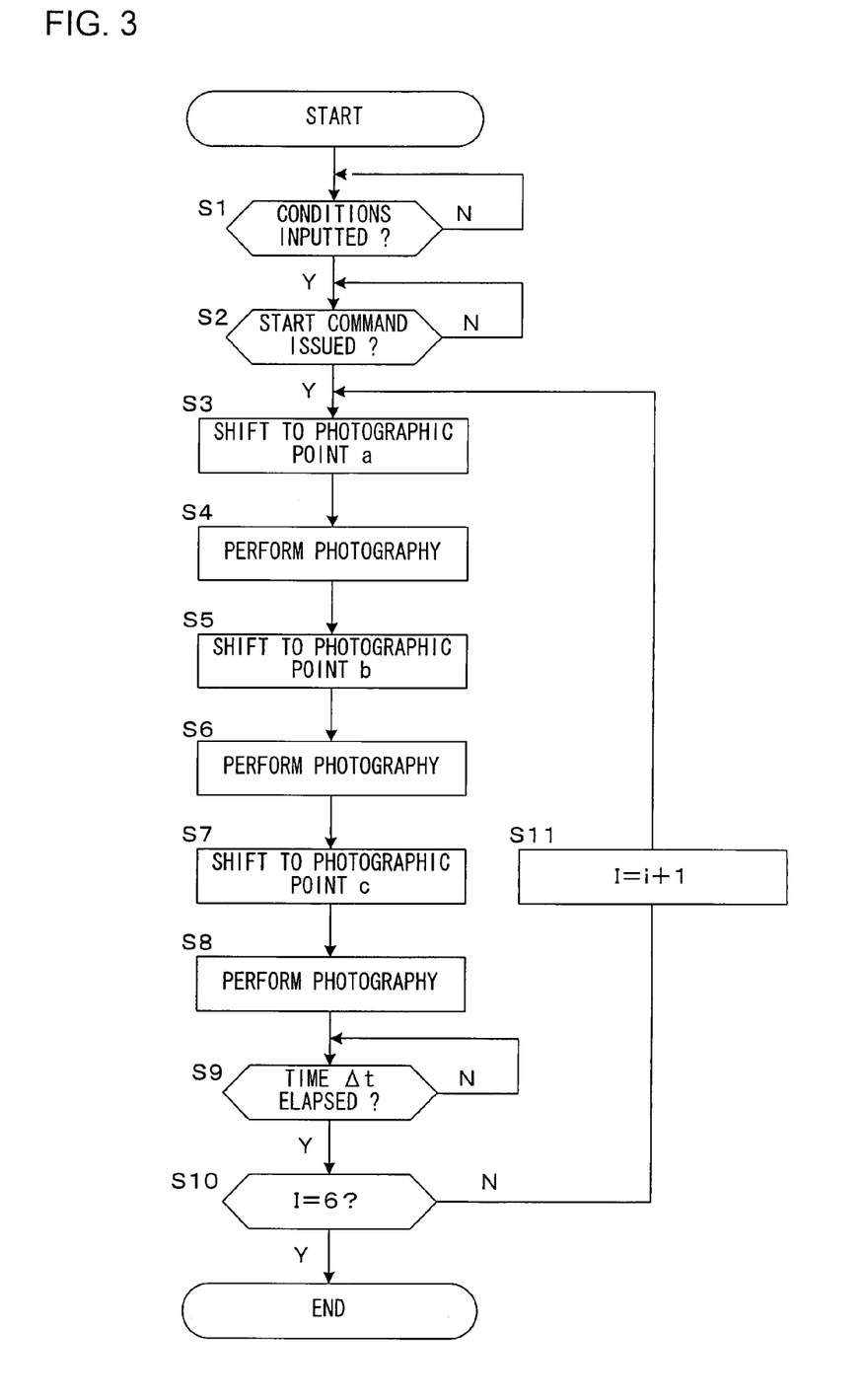
FIG. 3 is a flow chart showing steps in a procedure for establishing time lapse settings and performing time lapse photography.

If for example, during multi-point time lapse observation, there are to be three observation points, then photographic points a, b, and c are set in advance, as shown in FIG. 2A. FIG. 3 is a flow chart showing the steps for time lapse setting and photography, and processing for setting and photography will be explained with reference to this flow chart. The PC 50 performs the flow chart of FIG. 3 by executing a predetermined program.

In the step S1 of FIG. 3, a decision is made as to whether or not the conditions for multi-point time lapse photography have been inputted, and if it is decided that such input is present, then the flow of control proceeds to a step S2. As such conditions for time lapse photography, for example, there may be cited the photographic points, the time interval Δt for repeating photography, the continuous time lapse period ttotal, and the like. The operator designates the photographic points by shifting the pointer P of the pointing device 60 to the positions in the macro image 13a upon the display screen at which he desires to perform observations, while watching the photographic images 40a, 40b, and 40c that are displayed upon the monitor 40 (refer to FIG. 2A).

In the following, an example of a case of setting the three points a, b, and c shown in FIG. 2A as the photographic points will be explained. The operator shifts the pointer P to the position a by actuating the pointing device 60, and, when he performs confirmation actuation, the position a is set as the photographic point. By performing a similar operation, the operator then sets the points b and c in order as the photographic points. By this setting process, the x, y coordinates of each of the photographic points a, b, and c are stored in the storage unit of the PC 50. During the time lapse photography described hereinafter, photography is performed in order at these photographic points a, b, and c that have been inputted in this manner.

Furthermore, a condition input screen is displayed upon the monitor 40, and the operator inputs the photographic time interval Δt and the continuous time lapse period ttotal upon this screen by using the pointing device 60 and/or the keyboard. The photographic time interval Δt is the time interval from when photography at the points a, b, and c ends until the next time photography at the points a, b, and c is performed, while the continuous time lapse period ttotal is the time period from the start of the photographic process until the end of the photographic process. For example, if the photographic time interval Δt is set to 10 minutes and the continuous time lapse period ttotal is set to 60 minutes, then photography is performed 7 times at each of the photographic points, including photography when processing starts. In the following, the explanation will assume these conditions. When inputting of all of the conditions has been completed, a command is issued to start time lapse photography.

In the step S2, a decision is made as to whether or not such a command to start time lapse photography has been issued, and if it is decided that such a command has been issued, then a series of commands is issued to the electrically operated stage 30 (via the stage controller 31) and to the camera 20 according to the conditions that were inputted, so as automatically to execute the processing sequence of the steps S3 and following. In the processing from the step S3 to the step S8, one episode of photographic processing for the three photographic points a, b, and c is shown, and this photographic processing, of the sequence from the step S3 to the step S8 is repeatedly executed at the above described photographic time interval Δt.

First, in the step S3, based upon the x,y coordinate data Xa, Ya of the photographic point a that were stored when setting the photographic points, the electrically operated stage 30 is shifted by the stage controller 31 to a position in which the photographic point a is centered in the photographic screen, and the stage position Xai, Yai after shifting is stored. Here, i specifies the order of data acquisition, and its initial value is i=0. In other words, the stage position data that is initially obtained when proceeding from the step S2 to the step S3 is Xa0, Ya0. And next, in a step S4, photography of a microscopic image is performed at the photographic point a. And the photographic image data Ai that has been obtained is stored in correspondence with the stage position Xai, Yai and the magnification M of the optical system.

Next, in a step S5, based upon the x,y coordinate data Xb, Yb of the photographic point b that were stored when setting the photographic points, the electrically operated stage 30 is shifted by the stage controller 31 to a position in which the photographic point b is centered in the photographic screen, and the stage position Xbi, Ybi after shifting is stored. And next, in a step S6, photography of a microscopic image is performed at the photographic point b. And the photographic image data Bi that has been obtained is stored in correspondence with the stage position Xbi, Ybi and the magnification M of the optical system.

Next, in a step S7, based upon the x,y coordinate data Xc, Yc of the photographic point c that were stored when setting the photographic points, the electrically operated stage 30 is shifted by the stage controller 31 to a position in which the photographic point c is centered in the photographic screen, and the stage position Xci, Yci after shifting is stored. And next, in a step S8, photography of a microscopic image is performed at the photographic point c. And the photographic imaged at a Ci that has been obtained is stored in correspondence with the stage position Xci, Yci and the magnification M of the optical system. It should be understood that this photography of a microscopic image is performed by the PC 50 issuing a photographic command to the camera 20, and subsequently receiving a photographic image that has been photographed by the camera 20.

And next, in a step S9, a decision is made as to whether or not the time elapsed from the start of the processing of the step S3 has reached the photographic time interval Δt, and if a decision is made that the elapsed time has indeed reached Δt, then the flow of control proceeds to a step S10. In this step S10, a decision is made as to whether the value of i, that specifies the data acquisition order, has reached i=6 or not, in other words whether the continuous time lapse period ttotal has elapsed or not. Since, according to the conditions set in the step S2 described above, the initial value of i at which photography was performed for the first of 7 times at each photographic point was i=0, therefore the decision condition as to whether the continuous time lapse period ttotal has elapsed or not becomes i=6. If in this step S10 it is decided that i≠6 (NO) then the flow of control proceeds to a step S11, while if it is decided that i=6 (YES) then this series of processing operations related to photographic image data acquisition terminates.

If the flow of control has proceeded from the step S10 to the step S11, then the value of i is increased by 1 to i+1, and the flow of control then returns to the step S3. And then acquisition of photographic image data for a second time (with i=1) is performed again, in a similar manner to the case when acquiring photographic image data as described above for the first time by the processing from the step S3 through the step S8. Since this processing from the step S3 through the step S8 is repeatedly performed until i=6 achieves in the step S10, accordingly, as a result, a total of 21 (=3×7) sets of photographic image data A0, A1, . . . A6, B0, B1, . . . B6, C1, C2, . . . C6 are acquired, with the stage positions and the magnifications M of the optical system when the images for each point were acquired. These data sets are stored in the storage unit of the PC 50.

Now, as possible types of position setting method when shifting the electrically operated stage 30, there are available both open loop control and closed loop control in which feedback is performed. Open loop control is a type of control in which the rotation amount for the motor for driving the stage that is required in order for the stage to arrive at its target position is calculated, and the motor is rotated based upon this calculated amount. On the other hand, in the case of closed loop control, the stage is shifted to its target position while feeding back the position of the stage as detected by a linear encoder. A predetermined range centered around the target position is set in advance, and the shifting of the stage is stopped when the position of the stage, as detected, comes within this predetermined range.

Although open loop control was assumed in the above explanation, in the case of closed loop control, the coordinates (Xa, Ya), (Xb, Yb), and (Xc, Yc) when setting the photographic points are set as the target positions for the photographic points a, b, and c. Furthermore, instead of the coordinates (Xa, Ya); (Xb, Yb), and (Xc, Yc), it would also be acceptable to use the stage positions (Xa0, Ya0), (Xb0, Yb0), and (Xc0, Yc0) when acquiring photographic image data for the first time (i=0), as the target positions. And thereafter, for i=1 to i=6, it would be acceptable to perform shifting of the stage to these coordinates (Xa0, Ya0), (Xb0, Yb0), and (Xc0, Yc0) as targets.

By doing this, seven sets of photographic image data for different photographic time points are acquired for each of the plurality of photographic points a, b, and c, and these are replayed by being displayed upon the monitor 40. For example, by replay displaying these seven photographic images successively in order, it becomes possible easily to appreciate the changes over time of a living cell. However, as previously described, the problem arises that shaking of the image occurs if the accuracy of setting the position of the stage is poor.

In particular, if there are a large number (several tens or several hundreds) of photographic points or the like, then, due to the set time period for time lapse and the number of the photographic points, the time period available for stopping the stage at each photographic point becomes short, and it becomes necessary to drive the stage at high speed in order to shift from one photographic point to the next one, so that the accuracy by which the position of the stage is set may deteriorate. Accordingly, in this embodiment, it is arranged to correct the images that have been acquired, so that, by displaying these images that have thus been corrected, image shaking during successive image replay may be eliminated.

Explanation of Image Correction

Figure 4:
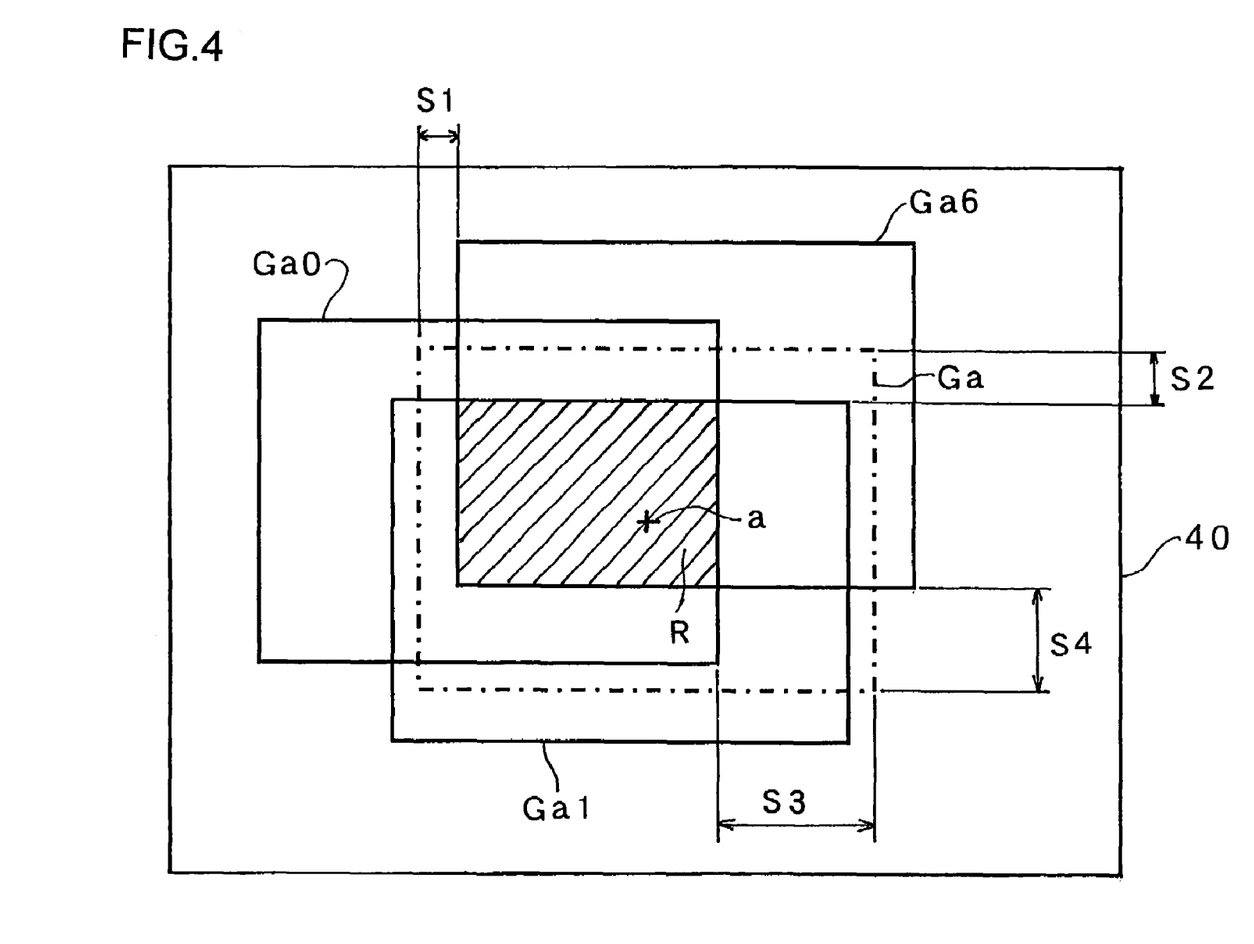
FIG. 4 is a figure showing photographic images Ga0, Ga1, and Ga6 displayed upon the display monitor 40.

Next, the method for correcting the photographic image data will be explained. Since the correction method is the same for the photographic image data at each of the photographic points a, b, and c, accordingly the method of correction will be explained for the photographic image data at the point a. As described above, due to error in setting the position of the stage, when the seven photographic images Ga0, Ga1, . . . Ga6 that have been obtained for the photographic point a are displayed simultaneously upon the monitor 40, the deviation in the position of the display occurs, as shown in FIG. 4. It should be understood that the photographic images Ga0, Ga1, . . . Ga6 are images that are based upon the photographic image data sets A0, A1, . . . A6, and in FIG. 4 only the three photographic images Ga0, Ga1, and Ga6 are shown, in order to avoid viewing difficulty occurring due to overlapping of the various photographic images. Moreover, it should be understood that the rectangular region Ga shown by the single dotted broken line indicates the ideal photographic image for the case that the position setting error=0.

Since, during photography, the electrically operated stage 30 is driven so as to center the photographic point a in the center of the image capture region, accordingly, if there were no position setting error, all of the photographic images Ga0, Ga1, . . . Ga6 would be photographed so that the photographic point a was in the center of the image. However, since actually position setting errors are present, the photographic images are in fact photographed so that the photographic point a is positioned as deviated from the center of the images. Because of this, as shown in FIG. 4, if the photographic images Ga0, Ga1, . . . Ga6 are displayed so that the photographic point a comes to be centered in the monitor 40, then the centers of the photographic images Ga0, Ga1, . . . Ga6 come to be deviated from the center of the monitor screen.

Although the photographic images Ga0, Ga1, . . . Ga6 shown in FIG. 4 are images that are mutually deviated from one another, the rectangular region R shown by the sloping hatched lines is included in all of these photographic images Ga0, Ga1, . . . Ga6. Thus, in this embodiment, it is arranged to trim down all of the photographic images Ga0, Ga1, . . . Ga6 to images of only this rectangular region R, and the resulting images Ga0', Ga1', . . . Ga6' after this correction by trimming are replayed and displayed upon the monitor 40.

Calculation of the Deviations of the Photographic Images

First, the required method for calculating the position setting error in order to perform trimming correction will be explained. As described above, the x,y coordinates of the photographic point a that are stored in the PC 50 by setting that photographic point a are Xa, Ya. The positional deviation amounts of the centers of the photographic images Ga0 Ga1, . . . Ga6 with respect to the center of the monitor 40 (the reference position), in other words the positional deviation amounts upon the image capture surface of the image capture element, are obtained by multiplying the respective positional deviation amounts of the electrically operated stage 30 by the magnification M. Since the positional deviation amounts of the stage 30 are the differences between the coordinates when setting the photographic point and the coordinates when photography is performed, accordingly the positional deviation amounts Δxai, Δyai upon the image capture surface are given by the following Equations (1) and (2):

$$\Delta xai = (Xai - Xa) \times M \quad (1)$$

$$\Delta yai = (Yai - Ya) \times M \quad (2)$$

Here, the CCD image sensor that is used in the camera 20 is supposed to be a square of side p (in pixels), so that, when the above described positional deviation amounts Δxai, Δyai are converted into numbers of pixels upon the CCD, the converted values ΔPxai, ΔPyai are given by the following Equations (3) and (4):

$$\Delta Pxai = \Delta xai/p = (Xai - Xa) \times M/p \quad (3)$$

$$\Delta Pyai = \Delta yai/p = (-Yai - Ya) \times M/p \quad (4)$$

Correction Processing

Next, the method for image correction by trimming will be explained. In the following, it is supposed that the sizes of the rectangular regions Ga and R, and the sizes of the photographic images, are expressed in terms of the number of pixels upon the CCD image sensor. The rectangular region R in FIG. 4 indicates the size of the images after trimming, and this rectangular region R is obtained by trimming away a width of S1 pixels from the region on the left side of the rectangular region Ga, by trimming away a width of S2 pixels from the region on the upper side of the rectangular region Ga, by trimming away a width of S3 pixels from the region on the right side of the rectangular region Ga, and by trimming away a width of S4 pixels from the region on the lower side of the rectangular region Ga.

As will be understood from FIG. 4, the left side of the rectangular region R coincides with the left side of the photographic image Ga6 that is deviated most to the right side. In a similar manner, the upper side of the rectangular region R coincides with the upper side of the photographic image Ga1 that is deviated most to the lower side, the right side of the rectangular region R coincides with the right side of the photographic image Ga0 that is deviated most to the left side, and the lower side of the rectangular region R coincides with the lower side of the photographic image Ga6 that is deviated most to the upper side. Due to this, the trimming widths S1, S2, S3, and S4 are given by S1=ΔPxa6, S2=−ΔPya1, S3=−ΔPxa0, and S4=ΔPya6. Accordingly, when performing trimming correction of the photographic images Gai, the trimming widths S1i through S4i for the four sides of each of the photographic images Gai are determined as in the following Equations (5) through (8):

$$\text{Left side: } S1i = S1 - \Delta Pxai \quad (5)$$

$$\text{Upper side: } S2i = S2 + \Delta Pyai \quad (6)$$

$$\text{Right side: } S3i = S3 + \Delta Pxai \quad (7)$$

$$\text{Lower side: } S4i = S4 - \Delta Pyai \quad (8)$$

When the series of photographic operations shown in FIG. 3 has been completed and all of the photographic images have been acquired, and after having performed calculation of the above described positional deviation amounts Δxai, Δyai upon the image capture surface and setting of the rectangular region R, then trimming correction of the various photographic images Gai is performed using trimming widths that are calculated by the above Equations (5) through (8). The photographic images Gai' after correction are stored in the storage unit of the PC 50 in correspondence with the photographic images Gai. On the other hand, it would also be acceptable to overwrite the photographic images Gai with the photographic images Gai' after correction. And, when performing replay and display of the photographic images in succession upon the monitor 40, it is the photographic images Gai' after correction that are displayed in succession. It should be understood that, since the trimming correction processing for the photographic images Gbi and Gci relating to the other two photographic points b and c is performed in exactly the same manner as the above described trimming in the case of the photographic images Gai, accordingly the explanation thereof will be omitted.

Figure 6:
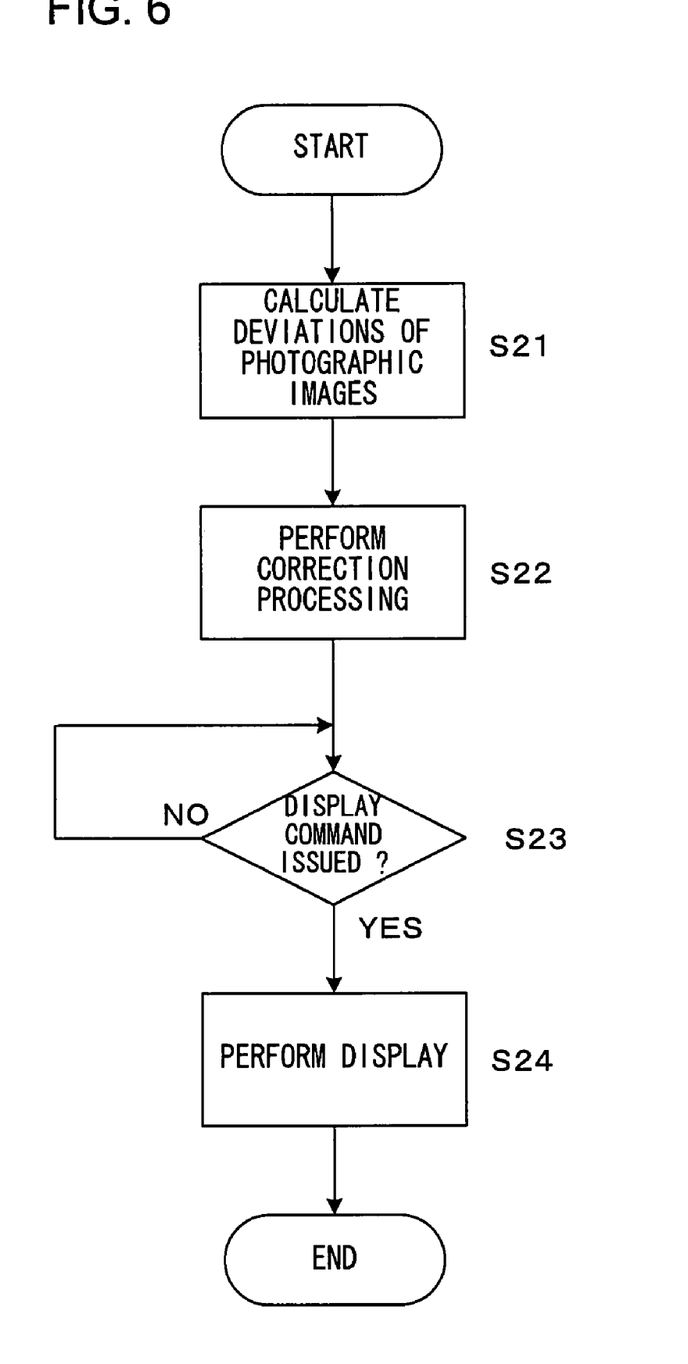
FIG. 6 is a flowchart showing processing for calculating the deviation of the photographic images, processing for correcting them, and processing for displaying them.

FIG. 6 is a flow chart showing processing for calculating the deviation of the photographic images, processing for correcting them, and processing for displaying them. This flow chart is performed by the PC 50 executing a predetermined program. In a first step S21, the above described calculation processing for the deviations of the photographic images is performed. In the next step S22, the above described correction processing is performed. And, in the next step S23, it is decided whether or not the operator has commanded display of the time lapse photographic images. If it is decided that display has been commanded, then the flow of control proceeds to a step S24, while if it is decided that display has not been commanded, then the processing of the step S23 is repeated and the system awaits a command. In the step S24, the photographic images Gai' after correction are displayed in order.

It should be understood that the steps S21 and S22 are steps that are performed after the processing of FIG. 3, described above, has been completed, while the step S24 is a step that is performed according to a command from the operator. However, it would also be acceptable to arrange for the step S23 to be performed before the processing of the step S21. In other words, it would also be acceptable to arrange, when a command has been issued by the operator for time lapse photographic imaging, for calculation processing of the deviations of the series of photographic images, correction processing of these images, and display processing of these images to be performed in order.

It should be understood that although, in the above explanation, the trimming widths S1 through S4 were set by comparing together the rectangular region R and the rectangular region Ga, and trimming of the photographic images was performed based upon the converted values ΔPxai, ΔPyai of the positional deviations of Equations (3) and (4), it would also be acceptable to use, for example, the photographic image Ga0, instead of the rectangular region Ga. In this case, the positional deviation amounts Δxai and Δyai would be obtained by referring to the coordinates (Xa0, Ya0) of the photographic image Ga0.

Since it is arranged to perform trimming correction in this manner upon the plurality of photographic images that have been photographed in succession for the same photographic point so that they all becomes images of the same photographic region that includes the photographic point, accordingly, even if position setting errors take place during photography, it is possible to eliminate shaking of the image when displaying these photographic images after correction successively in order.

A Variant Embodiment

In the embodiment described above, the trimming widths were set after all of the photographic images Gai, Gbi, and Gci were acquired, and trimming correction of the photographic images Gai, Gbi, and Gci was performed by using these trimming widths. However, in the case of closed loop control in which position setting of the electrically operated stage 30 is performed by detecting the position of the stage and using feedback thereof, it would also be acceptable to arrange to set a trimming width initially, and to perform position setting of the electrically operated stage 30 with error ranges that this trimming width can handle.

Figure 5:
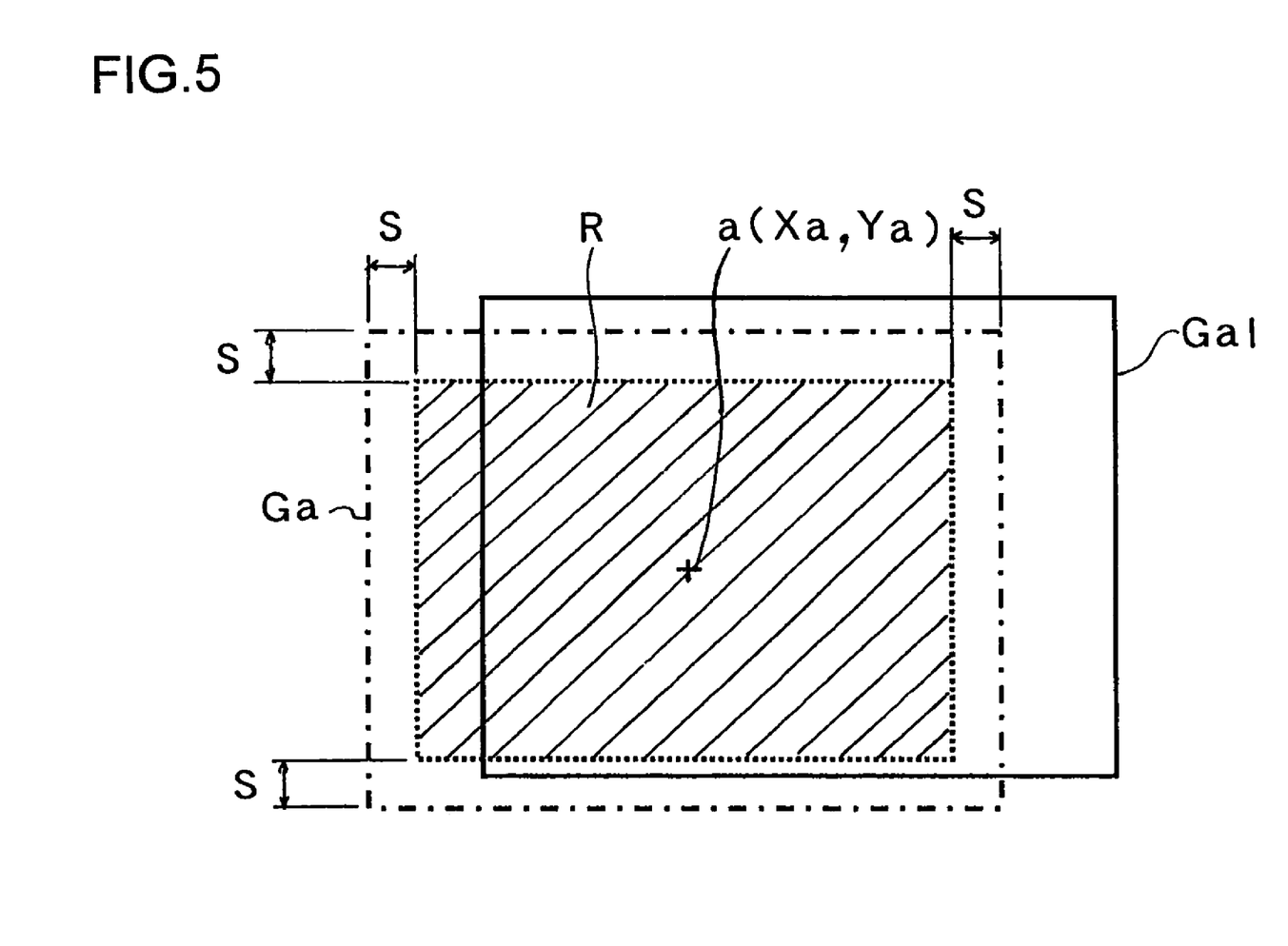
FIG. 5 is a figure for explanation of the setting of a trimming width S in a variant embodiment.

First, a trimming width S is set as shown in FIG. 5. In FIG. 5, the x,y coordinates of the photographic point a are the coordinates Xa, Ya that were read in when setting the photographic point a upon the monitor 40. Furthermore, the rectangular region Ga shows the photographic region that has been set with the coordinates Xa, Ya as center, and the rectangular region R shows this photographic image region after trimming correction. The electrically operated stage 30 is set to its position by feedback control using the coordinates Xa, Ya as target position.

Now, the case in which the upper, lower, left and right trimming widths of the rectangular region Ga are all set to S will be explained. The permitted position setting range when the trimming width S is set in this manner will be explained. The photographic image Ga1 in FIG. 5 shows the case when the position setting error with respect to the target position (Xa, Ya) is too large. In this case, at the left side of the rectangular region R, a portion of this region R extends outside the photographic image Ga1.

In other words since, in the case of the photographic image Ga1, there is no image data in the vicinity of the left side of the rectangular region R, accordingly it is not possible to trim the photographic image Ga1 to the size of the rectangular region R. Conversely, trimming also becomes impossible in a similar manner if the photographic image Ga1 has undesirably deviated to the left side with respect to the rectangular region R by a large amount. Accordingly, it is necessary to perform position setting control of the electrically operated stage 30 so that the position setting error LP xai in the left-right direction upon the image capture surface satisfies |ΔPxai|≦S. When the situation with regard to the up-down direction is considered in a similar manner, it is necessary to ensure that the position setting error ΔPyai in the up-down direction upon the image capture surface satisfies |ΔPyai|≦S.

When, using Equations (3) and (4), the position setting error upon the image capture surface is converted into a position setting error of the electrically operated stage 30, the following Equations (9) and (10) are obtained. And the stage coordinates X, Y are controlled by closed loop control so as to satisfy the conditions specified by Equations (9) and (10), and the electrically operated stage 30 is stopped at the time point that these conditions are satisfied. In this case, by setting the trimming width S to a size of such an order that hunting does not occur during closed loop control, it is possible to prevent the occurrence of hunting, and moreover it is possible to reduce the trimming width S.

$$|X-Xa| \leq (S \cdot p/M) \qquad (9)$$

$$|Y-Ya| \leq (S \cdot p/M) \qquad (10)$$

In this manner, with the present invention, by performing trimming correction upon the photographic images that have been acquired, it is possible to eliminate the influence of stage position setting errors upon the photographic images, and, during successive replay, it is possible to display a natural image in which no image shaking is present. Furthermore, since a software type method of correcting the photographic images is employed, accordingly it is possible simply and easily to apply this method to a prior art microscope system, without any requirement arising physically to change its hardware structure.

Figure 7:
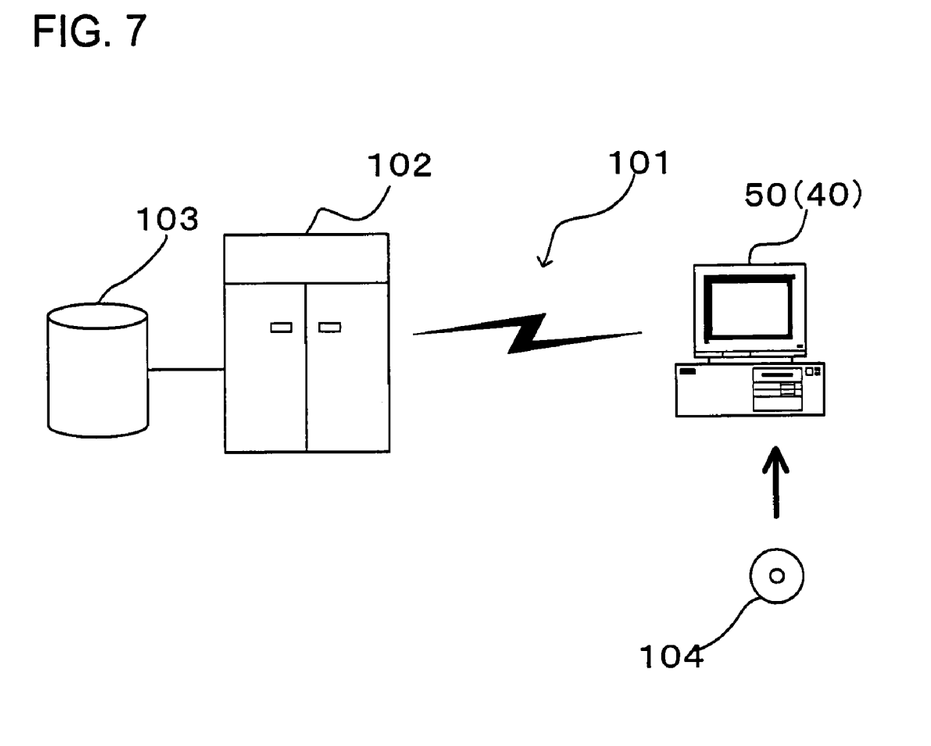
FIG. 7 is a figure showing a situation in which a program is supplied for execution by a PC 50.

FIG. 7 is a figure showing a situation in which a program that implements the above described microscope observation method is supplied for execution by the above described PC 50. The PC 50 may receive supply of this program via a CD-ROM 104. Furthermore, the PC 50 (plus the monitor 40) is endowed with a function of connection with a communication circuit 101. A computer 102 is a server computer that supplies the above described program, and that stores the program upon a recording medium such as a hard disk 103 or the like. The communication circuit 101 is a communication circuit such as the internet or the like, or a dedicated communication circuit or the like. The computer 102 may read out the program using its hard disk 103, and may transmit the program to the PC 50 via the communication circuit 101. In other words, the program may be transmitted via a communication circuit 101 by being carried as a data signal upon a carrier wave. In this manner, the program may be supplied as a computer-readable computer program product in various forms, such as a recording medium or a data signal or the like.

Moreover it should be understood that although, in the explanation of the embodiments provided above, a format for the microscope system was assumed in which the microscope 10, the camera 20, and the electrically operated stage 30 were connected to the PC main unit 50 as individual independently manufactured products, the present invention should not be considered as being limited by this feature. For example, this microscope system could also be implemented in the form of an integrated microscope, camera, and electrically operated stage. Furthermore, although this microscope system according to the present invention was explained using an inverted type microscope 10 as an example, the present invention could also be applied, in the same manner, to a microscope system that uses an upright type microscope. In this case, as shown in FIG. 7, the program could be also supplied as a computer-readable computer program product in various forms, such as a recording medium or a data signal or the like.

The above described embodiments are examples, and various modifications can be made without departing from the spirit and scope of the invention.

What is claimed is:

1. A microscope system comprising:
    an objective optical system;
    an image-capturing device that captures an observation image of an observation subject obtained through the objective optical system;
    a drive unit that drives a stage upon which the observation subject is mounted, and the objective optical system, relative to one another two dimensionally in directions orthogonal to an optical axis for observation of the objective optical system;
    a multi-point time lapse control unit that performs multi-point photography in which the objective optical system is relatively moved by controlling the drive unit in order onto a plurality of observation points that are set on the observation subject in advance and the image-capturing device captures an observation image of the observation subject at each of the plurality of observation points when the objective optical system is moved onto each of the plurality of observation points, and performs the multi-point photography a plurality of times at predetermined time intervals;
    a position detection unit that detects position coordinates of at least one of the stage and the objective optical system; and
    a correction unit that, based upon the position coordinates detected by the position detection unit, performs trimming correction upon a plurality of photographic images that have been photographed at one of the observation points as time elapses, so that the plurality of photographic images become images of a same observation region that includes the one of the observation points.

2. The microscope system according to claim 1, wherein the correction unit sets a common photographic region that is included in all of the plurality of photographic images as the same observation region based upon an amount of deviation between the position coordinates detected by the position detection unit and position coordinates of a corresponding observation point of the plurality of observation points that are set on the observation subject in advance.

3. The microscope system according to claim 1, wherein the multi-point time lapse control unit stops driving by the drive unit of the stage or of the objective optical system when the position coordinates detected by the position detection unit come within a position setting range that is set in advance.

4. The microscope system according to claim 2, wherein the correction unit sets a trimming amount for the trimming correction according to a magnitude of a position setting range based upon the amount of deviation.

5. A microscope observation method, comprising:
    driving an observation subject so that each of a plurality of observation points that are set on the observation subject in advance are moved in order onto an optical axis of an objective optical system;
    acquiring a plurality of observation images at one of the plurality of observation points by capturing an image of the observation, subject at the one of the plurality of observation points each time the observation subject is driven so that the one of the plurality of observation points arrives upon the optical axis of the objective optical system;
    obtaining an amount of deviation of each of the observation images that have been acquired at the one of the plurality of observation points, with respect to a reference position;
    trimming each of the observation images that have been acquired at the one of the plurality of observation points, based upon a corresponding observation image that has been acquired and upon the amount of deviation of the corresponding observation image that has been obtained; and
    displaying the trimmed observation images upon a display device.

6. The microscope observation method according to claim 5, wherein a region that is included in all of the plurality of observation images becomes a region after trimming.

7. A computer-readable computer program product, comprising:
    a program that causes a computer to execute the microscope observation method according to claim 5.

* * * * *